June 30, 1953  R. B. RUDY  2,643,540
ANTIFREEZE TESTER
Filed Feb. 25, 1952

INVENTOR.
Robert B. Rudy
BY
Howard L. Rose
AGENT

Patented June 30, 1953

2,643,540

UNITED STATES PATENT OFFICE 2,643,540

ANTIFREEZE TESTER

Robert B. Rudy, Washington, D. C., assignor to the United States of America as represented by the Secretary of Commerce Application February 25, 1952, Serial No. 273,320

2 Claims. (Cl. 73—17)

(Granted under Title 35, U. S. Code (1952), sec. 266)

The invention described herein may be manufactured and used by or for the Government of the United States of America for governmental purposes without the payment to me of any royalty thereon in accordance with the provisions of the act of March 3, 1883, as amended (45 Stat. 467; 35 U. S. C. 45).

This invention relates to a simple device for determining the practical freezing point of automotive antifreeze solutions.

Almost every motorist at some time or another during the winter driving season wishes to reassure himself as to the antifreeze protection in the cooling system of his automobile. If the antifreeze solution is known to contain only ethylene glycol or one of the common alcohols, a hydrometer may be used to determine protection with sufficient accuracy for all practical purposes, although it is quite common to have protection charts involving the necessary temperature and hydrometer readings incorrectly read by service station attendants.

Even though the operator may be entirely competent, the hydrometer becomes practically useless if the antifreeze solution contains propylene glycol, a mixture of glycols, a mixture of alcohols, or any combination of these materials. Solutions of propylene glycol, which have a specific gravity of about 1.038 at 20 degrees C., can be tested by means of a hydrometer, but the determination would have to be made with an accuracy that cannot readily be achieved by a service station attendant. Thus, there is an increasing need for a rapid, convenient, and inexpensive method for determining the protection with reasonable accuracy.

The object of this invention is to provide a quick and simple means for accurately determining the practical freezing point of liquids.

Another object of this invention is to provide a small portable device for the accurate determination of the practical freezing point of automobile antifreeze solutions.

Another object is to provide an antifreeze tester which to a great extent eliminates the human error from the determination.

Another object of the invention is to determine the practical freezing point of the antifreeze solution; that is, the lowest temperature at which it will flow through a passage which is comparable in size to the passages of an automobile radiator.

Other uses and advantages of the invention will become apparent upon reference to the specification and drawings.

In accordance with the present invention a sample of the antifreeze solution to be tested is allowed to flow into a passage, 1.5 mm. in diameter, in a brass cylinder. The antifreeze solution is frozen by some suitable coolant and then is allowed to warm up. As the cylinder warms up, the exit end of the passage is watched and when the second drop of antifreeze solution falls, the temperature is observed on a thermometer which has been inserted into the cylinder. In this manner the lowest temperature at which the liquid will flow through a passage comparable in size to the water passages in an automobile radiator is the temperature that is determined. This is called the practical freezing point of the liquid.

Figure 1:
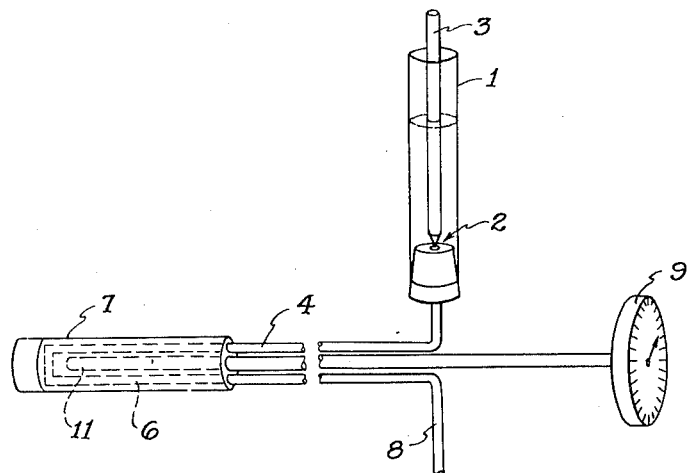
Figure 1 is a side view of the arrangement of the essential features of the tester.

The tester shown in Figure 1 comprises a reservoir 1 for the liquid to be tested. A valve 2 is located in the bottom of the reservoir and flow through the valve is controlled by the rod 3. Liquid from the reservoir flows through the tube 4 to the U-shaped passage 6 in the cylinder 7. The passage is 1.5 mm. in diameter, which size is comparable to the size of the water passages in an automobile radiator. The oulet tube 8 is connected to the other end of the passage 6. The thermometer 9, which may be of the bimetallic type, is inserted in a passage 11 in the cylinder. The passage 11 is located between and in close proximity to the two legs of the U-shaped passage 6.

Figure 2:
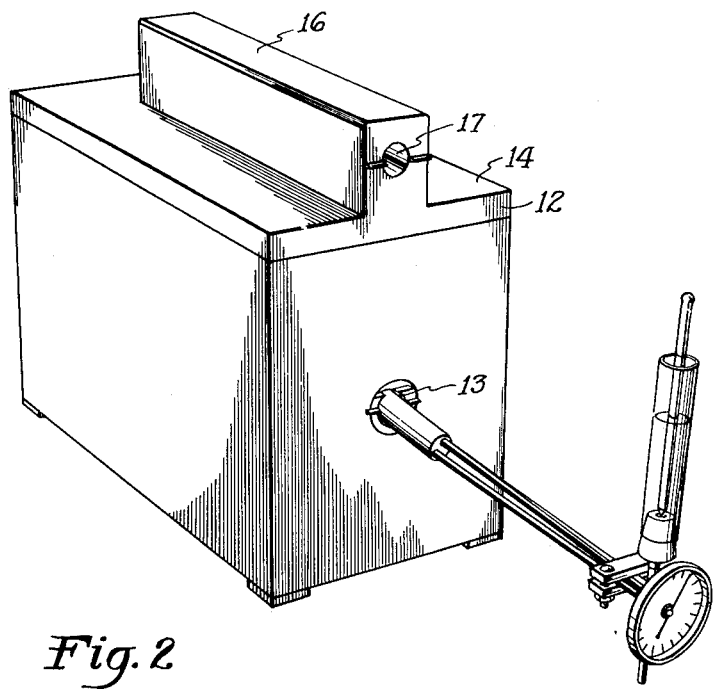
Figure 2 is a perspective view of the tester and the freezing cabinet.

The freezing compartment for use with the tester is shown in Figure 2. The box 12 is a well-insulated container which contains the coolant. This may be Dry Ice or any other suitable and readily available refrigerant. It is obvious, of course, that a small refrigeration unit could also be used to cool the cylinder. The cylinder 7 is inserted in the box through the opening 13. The lid 14 of the box 12 has mounted on it a wooden block 16 with a hole 17 in it. This provides a convenient receptacle for the cylinder during the warm-up period. Also a small heating coil may be included in the block 16 to reduce the time required for the warm-up period. The amount of heat supplied by the coil would necessarily be very small so that the temperature at the temperature-responsive element in the passage 11 does not lag behind the temperature of the solution in the passage 6.

The operation of the tester is as follows. A sample of the liquid to be tested is placed in the reservoir 1. The rod 3 is raised and liquid is allowed to flow until it has completely filled the passage 6 and starts to flow from the outlet tube 8. The rod 3 is then reseated and the cylinder is inserted in the hole 13 in the box 12. As the temperature falls below the freezing point of water the valve 2 is opened at approximately 10-degree intervals until it is found that there is no further flow of liquid from the outlet tube.

When it is certain that all flow is completely stopped, the cylinder is removed from the box and placed in the hole 17 provided in the block 16. The rod 3 is removed from the reservoir 1 thereby opening the valve 2 so that when the solution melts, flow will start through the system. As the cylinder slowly becomes warm, the outlet tube is watched and when the second drop of liquid falls, the temperature is read. This temperature is the lowest temperature at which the liquid being tested will circulate through a passage comparable in size to those found in the cooling system of an automobile. The determination requires from 3 to 6 minutes depending upon the freezing point of the liquid.

It will be apparent that the embodiment shown are only exemplary and that various modifications can be made in construction and arrangement within the scope of my invention as defined in the appended claims.

I claim:

1. A device for determining the practical freezing point of a solution comprising a cylinder, there being a U-shaped passage in said cylinder for receiving said solution, said passage being comparable in size to the passages in the cooling system of an automobile, a reservoir containing said solution and connected to one end of said U-shaped passage, a valve in said reservoir for controlling flow to said U-shaped passage, an outlet pipe connected to the other end of said U-shaped passage, there being a second passage in said cylinder located between and in close proximity to the two legs of said U-shaped passage, a thermometer with its temperature-responsive element located in said second passage, means for freezing the solution in said U-shaped passage and means for thawing said solution once it has been frozen.

2. An apparatus of the type described comprising a casing, a U-shaped passage in said casing for receiving said solution, a supply line to said passage including means for controlling the flow of said solution to said U-shaped passage, a second passage in said casing located between the two legs of said U-shaped passage, a temperature-measuring device having its temperature-responsive element located in said second passage, means providing a freezing chamber for receiving said cylinder, and means providing a thawing chamber for receiving said cylinder.

ROBERT B. RUDY.

References Cited in the file of this patent

UNITED STATES PATENTS

| Number | Name | Date |
|---|---|---|
| 1,096,911 | Hawxhurst | May 19, 1914 |
| 2,595,386 | Kajola | May 6, 1952 |